(12) United States Patent
Takemura et al.

(10) Patent No.: US 7,249,892 B2
(45) Date of Patent: Jul. 31, 2007

(54) ROLLING BEARING

(75) Inventors: Hiromichi Takemura, Fujisawa (JP); Yoshiaki Sakajiri, Fujisawa (JP)

(73) Assignee: NSK Ltd., Tokyo (JP)

( * ) Notice: Subject to any disclaimer, the term of this patent is extended or adjusted under 35 U.S.C. 154(b) by 110 days.

(21) Appl. No.: 10/520,184

(22) PCT Filed: Jul. 18, 2003

(86) PCT No.: PCT/JP03/09209

§ 371 (c)(1),
(2), (4) Date: Feb. 16, 2005

(87) PCT Pub. No.: WO2004/010016

PCT Pub. Date: Jan. 29, 2004

(65) Prior Publication Data

US 2005/0226546 A1    Oct. 13, 2005

(30) Foreign Application Priority Data

Jul. 23, 2002 (JP) ............................. 2002-213785
Aug. 23, 2002 (JP) ............................. 2002-242861

(51) Int. Cl.
*F16C 19/06* (2006.01)
(52) U.S. Cl. ........................ 384/450; 384/513
(58) Field of Classification Search ............... 384/450, 384/513, 419, 569
See application file for complete search history.

(56) References Cited

U.S. PATENT DOCUMENTS 3,292,980 A    12/1966    Gustafsson et al.

6,231,242 B1    5/2001    Yano et al.

FOREIGN PATENT DOCUMENTS

| EP | 1 070 864 A1 | 1/2001 |
|---|---|---|
| FR | 2 792 378 A1 | 10/2000 |
| JP | 1-188715 A | 7/1989 |
| JP | 2001-082462 | 3/2001 |
| SU | 399 205 A1 | 8/1976 |
| WO | WO 00/63569 | 10/2000 |

OTHER PUBLICATIONS

European Search Report, dated Aug. 1, 2005 (Three (3) pages).

*Primary Examiner*—Lenard A. Footland
(74) *Attorney, Agent, or Firm*—Crowell & Moring LLP

(57) ABSTRACT

When a minimum thickness of a part where an outer ring raceway is provided on a middle portion in the axial direction of an outer ring is h, and a diameter of each rolling element is Da, the relationship $0.4\,Da \leq h\,0.8\,Da$ is satisfied. As a result, even when the outer ring $4a$ is fixed in a transmission case of low-rigidity, elastic deformation of the outer ring can be prevented without needlessly increasing the thickness h of the outer ring.

When an outer diameter of an outer ring is D, a width of this outer ring in the axial direction is W, a minimum thickness of a part where the outer ring raceway is provided on a middle portion in the axial direction of the outer ring is h, and a diameter of each ball is Da, the respective dimensions are controlled such that a value K calculated by $\{(h^{1.5} \cdot W)/(Da^{1.1} \cdot D^{0.5})\}$ satisfies the relationship $1.20 \leq K \leq 2.00$. As a result, sufficient rigidity of the outer ring can be maintained, and early exfoliation based on elastic deformation of the outer ring can be prevented without needlessly increasing the size of the outer ring.

1 Claim, 7 Drawing Sheets

ROLLING BEARING

BACKGROUND OF THE INVENTION

1. Field of the Invention

The present invention relates to ensuring durability of rolling bearings for rotatably supporting rotating members of various rotating machinery and equipment such as pulleys on automobile alternators and belt-type continuously variable transmissions, and gears and the like constituting manual transmissions and automatic transmissions.

2. Description of the Related Art

Firstly, rolling bearings using a low-viscosity CVT fluid (including ATF compatible oil), and incorporated into transmission cases of low rigidity are described.

As disclosed in, for example, Japanese Examined Utility Model Publication No. H8-30526 and the like, a variety of belt-type continuously variable transmissions has been heretofore designed as speed changing units in automatic transmissions for automobiles, and some of these have been employed in practice. FIG. 1 shows the basic structure of such a belt-type continuously variable transmission in simplified form. This belt-type continuously variable transmission has an input rotating shaft 1 and an output rotating shaft 2 which are mutually arranged in parallel. These rotating shafts 1 and 2 are rotatably supported within a transmission case (not shown in drawings), which is a fixed part, by respective pairs of rolling bearings 3.

As shown in detail in FIG. 2, each rolling bearing 3 has a concentric outer ring 4 and an inner ring 5. The outer ring 4 has an outer ring raceway 6 on an inner peripheral face, and the inner ring 5 has an inner ring raceway 7 on an outer peripheral face. A plurality of rolling elements 8 are rotatably provided between the outer ring raceway 6 and the inner ring raceway 7 while being held by a retainer 9. In the rolling bearings 3 which are respectively constructed in this manner, the outer ring 4 is fixed to the inside of part of the transmission case, and the inner ring 5 is fixed on the outside of the input rotating shaft 1 or the output rotating shaft 2. Both of these rotating shafts 1 and 2 are rotatably supported within the transmission case by this construction. The outer ring 4, the inner ring 5, and the rolling elements 8 manufactured of general class 2 bearing steel (SUJ2), have conventionally been used for each rolling bearing 3.

Of the rotating shafts 1 and 2, the input rotating shaft 1 is driven to rotate by a drive source 10 such as an engine via a start clutch 11 such as a torque converter or electromagnetic clutch. Furthermore, a drive pulley 12 is provided at a part positioned between the pair of rolling bearings 3 in the middle portion of the input rotating shaft 1, so that this drive pulley 12 and the input rotating shaft 1 rotate synchronously. By displacing one drive pulley plate 13a (on the left in FIG. 1) in the axial direction with a drive actuator 14, the space between the pair of drive pulley plates 13a and 13b constituting the drive pulley 12 can be freely adjusted. That is to say, the width of the groove in the drive pulley 12 can be freely increased or decreased with the drive actuator 14.

On the other hand, a driven pulley 15 is provided at a part positioned between the pair of rolling bearings 3 in the middle portion of the output rotating shaft 2, so that this driven pulley 15 and the output rotating shaft 2 rotate synchronously. By displacing one driven pulley plate 16a (on the right in FIG. 1) in the axial direction with a driven actuator 17, the space between the pair of driven pulley plates 16a and 16b constituting the driven pulley 15 can be freely adjusted. That is to say, the width of the groove in the driven pulley 15 can be freely increased or decreased with the driven actuator 17. An endless belt 18 is spanned between the driven pulley 15 and the drive pulley 12. For this endless belt 18, a metal belt is used.

In the belt-type continuously variable transmissions constructed as described above, the drive transmitted from the drive source 10 to the input rotating shaft 1 via the start clutch 11 is transmitted from the drive pulley 12 to the driven pulley 15 via the endless belt 18. Heretofore as the endless belt 18, there is known one wherein drive is transmitted in the push direction, and one wherein drive is transmitted in the pull direction. In either case, the drive transmitted to the driven pulley 15 is transmitted to a drive wheel 21 from the output rotating shaft 2 via a reduction gear train 19, and a differential gear 20. When changing the gear ratio between the input rotating shaft 1 and the output rotating shaft 2, the groove width of the pulleys 12 and 15 is increased or decreased while changing the relationship between the two.

For example, to increase the speed reduction ratio between the input rotating shaft 1 and the output rotating shaft 2, the width of the groove in the drive pulley 12 is increased, and the width of the groove in the driven pulley 15 is decreased. As a result, the diameter of the parts of the pulleys 12 and 15 spanned by part of the endless belt 18 is decreased on the pulley 12, and increased on the pulley 15, and speed reduction is performed between the input rotating shaft 1 and the output rotating shaft 2. Conversely, to increase the speed increasing ratio between the input rotating shaft 1 and the output rotating shaft 2 (decrease the speed reduction ratio), the width of the groove of the drive pulley 12 is decreased, and the width of the groove of the driven pulley 15 is increased. As a result, the diameter of the parts of the pulleys 12 and 15 spanned by part of the endless belt 18 is increased on the pulley 12, and decreased on the pulley 15, and speed increase is performed between the input rotating shaft 1 and the output rotating shaft 2.

When operating the belt-type continuously variable transmission constructed and operating as described above, lubricating oil is supplied to each moving part to lubricate each moving part. The lubricating oil employed in the belt-type continuously variable transmission is CVT fluid (including ATF compatible oil). The reason for this is to increase and stabilize the coefficient of friction of the frictional engagement parts of the metal endless belt 18 and the drive and driven pulleys 12 and 15. The CVT fluid is circulated to the frictional engagement parts at a flow rate of at least 300 cc per minute to lubricate these frictional engagement parts. Moreover, part of the CVT fluid is passed through the interior of each of the rolling bearings 3 (for example, at a flow rate of at least 20 cc per minute) to lubricate the rolling contact parts of the rolling bearings 3. Therefore there is a high possibility that foreign matter such as wear particles generated by wear accompanying frictional between the endless belt 18 and the pulleys 12 and 15, and gear dust generated by friction in the reduction gear train 19, will become mixed with the CVT fluid and enter the interior of these rolling bearings 3. Such foreign matter may damage the rolling contact parts of the rolling bearings 3, and reduce their durability.

Therefore, heretofore the bearing size of the rolling bearings 3 has been increased, or the diameter Da of the rolling elements 8 has been increased, to increase the basic dynamic load rating of the rolling bearings 3, and to provide a margin for the life of the rolling bearings 3. However, when in this manner the diameter Da of the rolling elements 8 is increased to maintain the basic dynamic load rating, a thickness T of the outer ring 4 must be reduced (made thinner) to reduce the size and weight of the belt-type continuously variable transmission. Furthermore, when the rigidity of the transmission case securing the outer ring 4 is low, if the thickness T of this outer ring 4 is reduced in this manner, elastic deformation of the outer ring 4 occurs readily, and an excessive bending stress is applied to the outer ring 4 accompanying the deformation, so that there is a possibility that the life of the rolling bearings 3 will be reduced.

For example, in the Proceedings of the Tribology Conference of the Japanese Society of Tribologists (Morioka 1992-10) E-33, pp 793-796, it is disclosed that the life of this rolling bearing was reduced by ¼ to ⅕ when the rolling bearing was operated with a bending stress of 70 MPa applied to the raceway ring, in comparison to the case where a bending stress was not applied. Furthermore, it is disclosed that, in order to prevent such a reduction in life, manufacture of the raceway ring from a material wherein a residual compression stress has been applied is effective. However, in order to employ the material wherein such a retained compression stress has been applied, carburized steel must be employed in the raceway ring, and mechanical processes such as shot-peening and the like must be applied to the raceway face of the raceway ring, with the possibility of increased cost.

Recently, in order to ensure the efficiency of belt-type continuously variable transmissions, to suppress noise generated during operation, and to suppress wear of the drive and driven pulleys 12 and 15, and the endless belt 18, the use of a fluid of lower viscosity is under consideration as a CVT fluid. In this case, if standard rolling bearings are employed as the rolling bearings 3 to support the input and output rotating shafts 1 and 2, the possibility of premature flaking is considered to increase. That is to say, the action of vibration in the radial and axial directions accompanying belt fluctuations exacerbates elastic deformation of the outer ring 4 and the inner ring 5, and an excessive bending stress is applied to the outer ring 4 and the inner ring 5. Accompanying this deformation and excessive bending stress, metal-to-metal contact based on sliding, occurs more readily in the rolling contact parts between the outer ring raceway 6 and the inner ring raceway 7, and the rolling contact surfaces of the rolling elements 8, and the possibility of premature flaking of the outer ring raceway 6, the inner ring raceway 7, and the rolling contact surfaces of the rolling elements 8 increases due to such metal-to-metal contact.

That is to say, there are cases where the temperature of the rolling bearing 3 during operation of the belt-type continuously variable transmission may exceed 100° C. At this time the kinetic viscosity of the CVT fluid which enters the interior of the rolling bearing 3 and lubricates the rolling contact parts of the rolling bearing 3 is considerably low at 10 mm² per second or less. Moreover, there is also a possibility of a tendency for the amount of CVT fluid supplied to the rolling contact parts to become insufficient. Furthermore, when the rigidity of the transmission case, being the fixed part, is low, the outer ring 4 fixed to the transmission case is readily elastically deformed, and sliding based on differential movement, revolution, and spinning of the rolling elements 8 occurs readily in the rolling contact parts accompanying this deformation. As a result, together with the lack of CVT fluid as described above, the oil film on the rolling contact parts readily breaks up. When the oil film breaks up in such a manner, the outer ring raceway 6 and the rolling contact surfaces of the rolling elements 8 enter an activated state wherein surface fatigue associated with, for example, hydrogen embrittlement flaking due to hydrogen penetration, and metal-to-metal contact, is accelerated, and the possibility of premature flaking increases.

On the other hand, according to Hertz' theory of elastic contact, the maximum shear stress under rolling contact is calculated to occur at a depth from the raceway face of approximately 2% of the diameter of the rolling element. In this case, the thickness of the raceway ring wherein the maximum shear stress occurs is calculated as being semi-infinite. On the other hand, in the case of a standard JIS name and number's rolling bearing, the thickness of the raceway ring tends to be set approximately ten times the depth from the raceway face to the position where the maximum shear stress occurs, that is to say, approximately 20% of the diameter of the rolling element 8. The reason for this is that, when the raceway ring is fixed to a highly rigid part, if the thickness of this raceway ring is approximately 20% of the diameter of the rolling element, the Hertz' theory of elastic contact wherein the thickness of this raceway ring is considered as semi-infinite is established. Moreover, it is considered that experimentally sufficient durability can be maintained. Therefore, in the case of the rolling bearing 3 incorporated in the belt-type continuously variable transmission, if the rigidity of the transmission case is low, the thickness of the outer ring 4 fixed to this transmission case must be increased (made thicker) to ensure durability of the rolling bearing 3. However, simply increasing the thickness of the outer ring 4 in this manner invites increased weight associated with increased size, and increased rolling resistance. Therefore it is not desirable.

In Japanese Unexamined Patent Publication No. H10-37951, there is disclosed an invention for improving the permissible high-speed performance of rolling bearings used for machine tools, by increasing the thickness of the outer ring in comparison to the thickness of the inner ring. That is to say, a construction is disclosed wherein ceramic rolling elements are used to thereby reduce the centrifugal force applied to the outer ring, being the fixed raceway ring. Moreover, in order to reduce the centrifugal force generated in the inner ring, being the rotating raceway ring, the thickness of this inner ring is made 2.5 mm to 4.0 mm, and the thickness of the outer ring is 2.0 to 2.75 times the thickness of the inner ring. However, with this structure, the purpose of making the thickness of the outer ring greater than the thickness of the inner ring is simply to reduce the centrifugal force by reducing the thickness of the inner ring, and not to prevent elastic deformation of the outer ring fixed to the low-rigidity part. Moreover, since the rolling elements are made of ceramic, increased materials costs and machining costs cannot be avoided. Furthermore, since the thickness of the outer ring is excessive, the rolling contact surfaces of the rolling elements are readily damaged, as described later.

Next is a description of a rolling bearing fixed to an alternator having a low-rigidity housing made for example from aluminum alloy.

In various auxiliary equipment having as a power source the drive engine of an automobile, a rotating shaft is rotatably supported in relation to the housing, and a driven pulley is fixed to one end of this rotating shaft on a portion projecting from the housing. The various auxiliary equipment can be freely driven by transmitting the rotation of the engine crankshaft to this driven pulley via an endless belt. FIG. 3 shows an example of an alternator which generates electric power necessary for an automobile, being one of such various auxiliary equipment. In this alternator 101 a rotating shaft 103 is rotatably supported inside a housing 102 made from a light metal such as aluminum alloy, by a pair of rolling bearings 104. Each of these rolling bearings 104 comprises an inner ring 106 having an inner ring raceway 105 formed on an outer peripheral surface, an outer ring 108 having an outer ring raceway 107 formed on an inner peripheral surface, and a plurality of balls 109 being rolling elements, rotatably arranged between the inner ring raceway 105 and the outer ring raceway 107.

Moreover, a rotor 110 and a commutator 111 are provided in the middle portion of the rotating shaft 103. Furthermore, a driven pulley 112 is fixed to an end part of the rotating shaft 103 projecting from the housing 102. With the housing 102 fixed to the engine (not shown in drawings), an endless belt (not shown in drawings) is wrapped around the driven pulley 112, so that the rotation of the crankshaft of the engine can be freely transmitted to the rotating shaft 103 via the endless belt. Moreover, a stator 113 is fixed to a part surrounding the rotor 110 on the inside of the housing 102. In the alternator 101 constructed in this manner, the rotating shaft 103 provided with the rotor 110 is rotated by the rotation of the engine, and electric current is generated in the stator 113 facing this rotor 110.

When the alternator 101 constructed as described above is in use, while the inner rings 106 constituting the rolling bearings 104 rotate, a radial load is continuously applied in the same direction to the inner rings 106 based on the tension of the endless belt. When such a radial load is applied to the outer rings 108 via the balls 109, and the rigidity of the housing 102 securing the outer rings 108 is low, there is a possibility that the outer rings 108 may elastically deform together with the housing 102. Such elastic deformation of the outer rings 108 is considered to be a cause of damage such as premature flaking of the outer rings 108.

That is to say, it is considered that, when the outer rings 108 elastically deform together with the housing 102 based on the radial load, this radial load is applied to the outer ring 108 as an unbalanced load, and the outer rings 108 vibrate more readily. Under such an unbalanced load and vibration, it becomes more difficult to form an oil film of lubricant such as grease or lubricating oil on the rolling contact parts between the inner ring raceway 105 and the outer ring raceway 107 and the rolling contact surface of each ball 109. Furthermore, if the lubricant contains water, or if moisture penetrates from the outside, there is also a possibility that formation of an oil film on the rolling contact parts will become more difficult. When it becomes difficult to form an oil film on the rolling contact parts in this manner, metal-to-metal contact occurs more readily between the inner ring raceway 105 and the outer ring raceway 107, and the rolling contact surface of the balls 109, and there is a possibility of premature flaking of the inner ring raceway 105, the outer ring raceway 107, and the rolling contact surface of the balls 109.

Inventions are disclosed to prevent such premature flaking in, for example, Japanese Unexamined Patent Publication No. 2001-221238 wherein the constituents of the material of the outer ring are controlled, and in Japanese Unexamined Patent Publication No. H5-98280 wherein the constituents of the grease are controlled. However, with the rolling bearings incorporated into auxiliary equipment (electrical components) for automobiles, such as alternators and electromagnetic clutches, conditions of use have become more severe with the effects of increased temperature and speed due to improvements in engine performance associated with recent technical innovations, and increased loads associated with increase in belt tension. Therefore mere control of the components constituting the rolling bearings and the lubricant is no longer sufficient to accommodate these changes in conditions of use, and the possibility of a reduced life due to premature flaking has appeared.

SUMMARY OF THE INVENTION

The present invention provides a rolling bearing for use in belt-type continuously variable transmissions wherein damage such as premature flaking and the like to the outer ring raceway, the inner ring raceway, and the rolling contact surfaces of the rolling elements constituting the rolling contact parts does not occur readily, even when the outer ring is fixed to a transmission case of low-rigidity material such as aluminum alloy.

The rolling bearing of the present invention comprises an outer ring, an inner ring, and a plurality of rolling elements.

Of these, the outer ring has an outer ring raceway on its inner peripheral surface.

Moreover, the inner ring has an inner ring raceway on its outer peripheral surface.

Furthermore, the rolling elements are rotatably provided between the outer ring raceway and the inner ring raceway.

The outer ring is fitted into and supported inside a fixed part of a transmission case, and the inner ring is fitted onto and supported on a part which rotates together with a pulley constituting the belt-type continuously variable transmission, such as the end or an intermediate part of input and output rotating shafts, so that the pulley is rotatably supported on the fixed part.

In particular, in the rolling bearing for use in belt-type continuously variable transmissions, when the minimum thickness (thickness in the radial direction) of the part where the outer ring raceway is provided on the central portion in the axial direction of the outer ring is h, and the diameter of the rolling elements is Da, the relationship $0.4\,Da \leq h \leq 0.8\,Da$, or more desirably, $0.4\,Da \leq h \leq 0.6\,Da$, is satisfied.

In the rolling bearing for use in belt-type continuously variable transmissions of the present invention constructed as described above, sufficient flaking life can be maintained, even if a low-viscosity CVT fluid is used, and the rolling bearing is incorporated into a low-rigidity transmission case.

That is to say, even when the outer ring is fixed to a low-rigidity transmission case made of aluminum alloy for example, elastic deformation of the outer ring, and application of excessive stress on the outer ring accompanying this deformation can be prevented, without needlessly increasing the thickness of the outer ring. Therefore even in cases where, due to using a low-viscosity CVT fluid, or not circulating a large volume of lubricating oil (for example, a volume greatly exceeding 20 cc per minute) inside of the rolling bearing, it is difficult to maintain the strength of an oil film on the rolling contact parts between the outer ring raceway and the inner ring raceway, and the rolling contact surface of the rolling elements, it is possible to prevent metal-to-metal contact in these rolling contact parts, and to maintain sufficient flaking life. It is therefore no longer necessary to increase the size of the rolling bearing in order to maintain the necessary durability, so that the rotating support parts of the input rotating shaft and the output rotating shaft can be made small and light-weight, and turning resistance can be reduced. As a result, the belt-type continuously variable transmission can be reduced in size and weight, and transmission efficiency can be improved.

In particular, in the rolling bearing incorporated into auxiliary equipment (electrical components) for automobiles such as alternators and electromagnetic clutches, if the outer diameter of the outer ring is D, the width in the axial direction of this outer ring is W, the minimum thickness of the part where the outer ring raceway is provided on the central portion in the axial direction of the outer ring is h, and the diameter of the rolling elements is Da, the relationship $1.20 \leq \{(h^{1.5} \cdot W)/(Da^{1.1} \cdot D^{0.5})\} \leq 2.00$ is satisfied.

According to the rolling bearing of the present invention constructed as described above, even if the outer ring is fixed to a low-rigidity housing made of a light metal such as aluminum alloy, sufficient rigidity of the outer ring can be maintained, and premature flaking based on elastic deformation of the outer ring can be prevented, without needlessly increasing the size of the outer ring, and consequently the rolling bearing.

That is to say, if the rigidity of the housing is low, the outer ring elastically deforms together with the housing to an extent which cannot be ignored, and the load zone is reduced. That is to say, the outer ring is elastically deformed such that it is expanded outwards in the radial direction around the part wherein the load is applied, and the expanded part can no longer support the load. Therefore there is a tendency for the load to be concentrated at the part where the load is applied. If the rolling elements enter the part where the load is concentrated in this manner from the non-load zone, a constraining force is applied abruptly to these rolling elements (the extent of constraint increases considerably), and severe slippage occurs readily between the rolling contact surfaces of the rolling elements and the outer ring raceway and the inner ring raceway. The oil film formed on the rolling contact parts between the rolling contact surfaces of the rolling elements and the inner ring raceway and the outer ring raceway then readily breaks down accompanying this slippage, and metal-to-metal contact occurs readily between the rolling contact surfaces of the rolling elements and the inner ring raceway and the outer ring raceway. Moreover, also if the rolling elements spring out from the load zone, since they are suddenly released from a large constraining force, slippage occurs in the same manner, and metal-to-metal contact occurs readily accompanying this slippage. Premature flaking then occurs readily in the rolling contact parts between the rolling contact surfaces of the rolling elements and the inner ring raceway and the outer ring raceway based on this metal-to-metal contact. If the rigidity of the housing is low, the outer ring raceway also readily deforms elastically (such that the peripheral groove forms a wave-shape in the radial direction) based on the load from the rolling elements in (passing through) the load zone. The slippage also occurs readily due to elastic deformation of the raceway face in this manner, and may accelerate premature flaking.

Therefore the thickness h and the width W of the outer ring are optimized so that as mentioned above, these are controlled to $1.20 \leq \{(h^{1.5} \cdot W)/(Da^{1.1} \cdot D^{0.5})\} \leq 2.00$, and elastic deformation of the outer ring does not occur readily, and premature flaking due to the mechanism described above is thus prevented. If the value calculated in the expression $\{(h^{1.5} \cdot W)/(Da^{1.1} \cdot D^{0.5})\}$ (hereafter referred to as 'K') is less than 1.20, the rigidity of the outer ring is too low, and if the outer ring is fixed to a low-rigidity housing made of aluminum alloy or the like, elastic deformation of the outer ring occurs readily and flaking as described above may occur at an early stage. On the other hand, if K exceeds 2.00, the rigidity of the outer ring may be too high, so that when the rolling elements are assembled into the rolling bearing, deformation of the outer ring exceeds the range of elastic deformation, so that plastic deformation occurs and the outer ring is damaged.

DETAILED DESCRIPTION OF THE INVENTION

Figure 4:
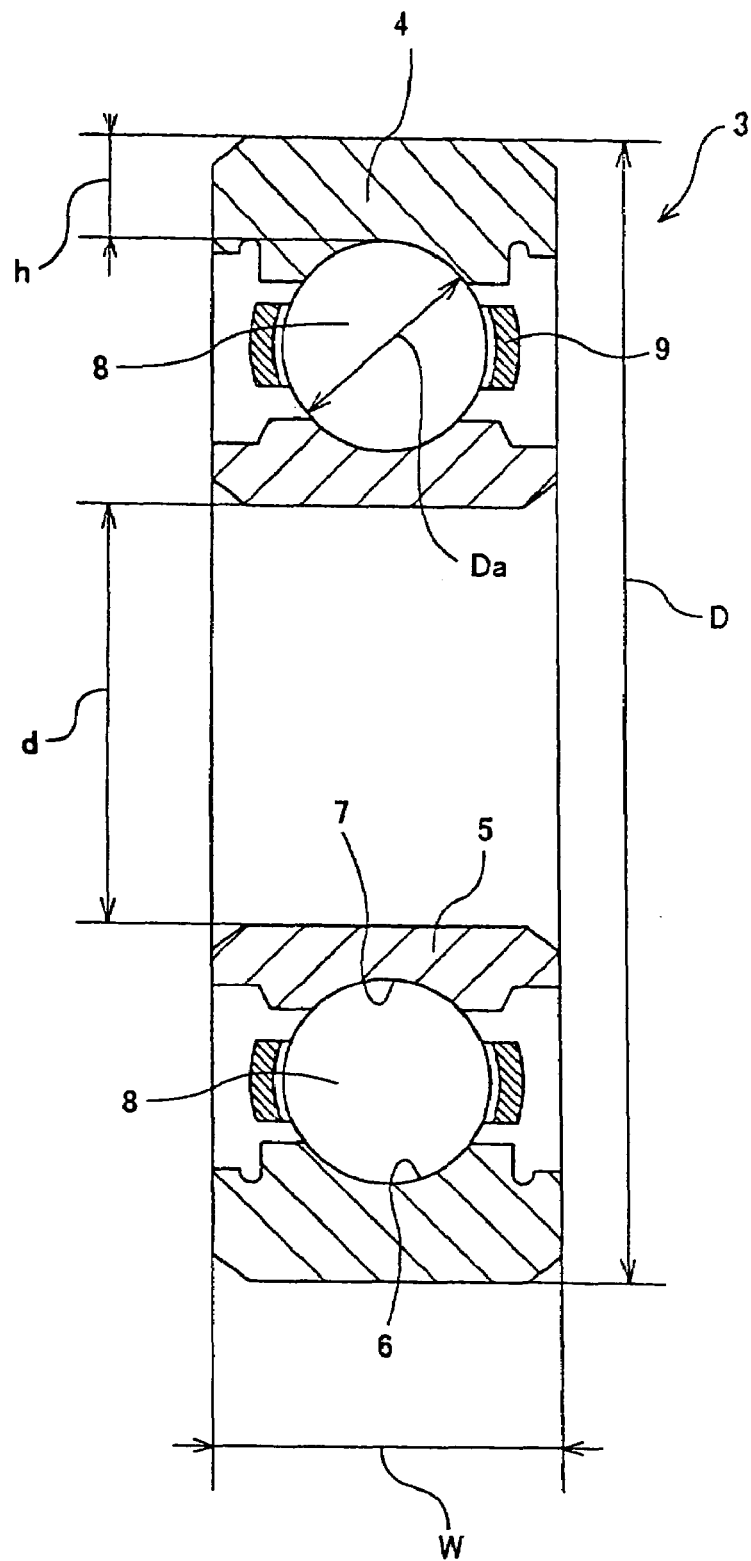
FIG. 4 is section view similar to FIG. 2, showing an example of an embodiment of the present invention.

FIG. 4 shows an example of an embodiment of the present invention. A characteristic of the present invention is that a structure is devised for a rolling bearing 3 for supporting input and output side rotating shafts 1 and 2 (see FIG. 1) for a belt-type continuously variable transmission, so that even when the rigidity of a transmission case is low, sufficient durability of the rolling bearing 3 is maintained. Since the structure and operation of other parts, including the structure shown in FIG. 2, are similar to the heretofore known rolling bearings for belt-type continuously variable transmissions, equivalent parts are denoted by the same reference symbols, and duplicated description is omitted or simplified. Hereunder, the description focuses on characteristic parts of the present invention.

In the present example, when the minimum thickness (thickness in the radial direction) of the part where the outer ring raceway 6 is provided on the middle portion in the axial direction of the outer ring 4 is h, and the diameter of the rolling elements 8 is Da, the dimensions of the outer ring 4 are controlled so that the relationship $0.4\,Da \leq h \leq 0.8\,Da$, or more desirably, $0.4\,Da \leq h \leq 0.6\,Da$, is satisfied. Furthermore, the width W in the axial direction of the outer ring 4 and the inner ring 5 is controlled within a range which satisfies $1.2\,Da \leq W \leq 2.5\,Da$. In the case of the rolling bearing 3 in the present example, sufficient flaking life can be maintained, even if a low-viscosity CVT fluid is used and the rolling bearing is incorporated into a low-rigidity transmission case.

That is to say, even when the outer ring 4 is fixed to a light-weight and low-rigidity transmission case such as of aluminum alloy, elastic deformation of the outer ring 4, and application of excessive stress on the outer ring 4 accompanying this deformation, can be prevented without needlessly increasing the thickness h of the outer ring 4. Therefore even in cases where, due to using a low-viscosity CVT fluid, or not circulating a large volume of lubricating oil (for example, volumes greatly exceeding 20 cc per minute) inside of the rolling bearing 3, it is difficult to maintain the strength of an oil film on the rolling contact parts between the outer ring raceway 6 and the inner ring raceway 7, and the rolling contact surface of the rolling elements 8, it is possible to prevent metal-to-metal contact in these rolling contact parts, and to maintain sufficient flaking life. It is therefore no longer necessary to increase the size of the rolling bearing 3 in order to maintain the necessary durability, so that the rotating support parts of the input rotating shaft 1 and the output rotating shaft 2 can be made small and light-weight, and turning resistance can be reduced. As a result, the belt-type continuously variable transmission can be reduced in size and weight, and transmission efficiency can be improved.

If the minimum thickness h of the outer ring 4a exceeds 0.8 Da, the rolling elements 8 are not readily assembled into the rolling bearing 3. That is to say, when the rolling bearing 3 is assembled using automatic assembly equipment, the rolling elements 8 which are normally assembled last, are assembled into the rolling bearing with the outer ring 4 elastically deformed. Therefore, if the minimum thickness h exceeds 0.8 Da, the load required to elastically deform the outer ring 4 increases, so that the outer ring 4 and the rolling elements 8 may be readily damaged, and it may no longer be possible to assemble using automatic assembly equipment. On the other hand, if the minimum thickness h is less than 0.4 Da, and if the rigidity of the transmission case which secures the outer ring 4 is low, the outer ring 4 is readily elastically deformed, and premature flaking may occur on the outer ring raceway 6 and the inner ring raceway 7, and the rolling contact surfaces of the rolling elements 8.

Moreover, the width W in the axial direction of the outer ring 4 and inner ring 5 is desirably as large as possible to prevent elastic deformation of the outer ring 4 and the inner ring 5. However, if the width W is increased, the mass of the outer ring 4 and the inner ring 5 is also increased. That is to say, if the width W exceeds 2.5 Da, the mass of the outer ring 4 and the inner ring 5 become too large, and the transmission efficiency of the belt-type continuously variable transmission may be reduced. On the other hand, if the width W is less than 1.2 Da, the rigidity of the outer ring 4 and the inner ring 5 is reduced, and the outer ring 4 and the inner ring 5 may readily elastically deform. It is therefore desirable that the width W be kept within a range of 1.2 Da or greater and 2.5 Da or less.

Furthermore, in the present example, no sealing members are provided in the openings at both ends of the part where the plurality of rolling elements 8 are provided between the inner peripheral surface of the outer ring 4 and the outer peripheral surface of the inner ring 5. However, when there is a high possibility of entry of a significant amount of foreign matter such as wear particles from the drive and driven pulleys 12 and 15 and the endless belt 18 (see FIG. 1), it is desirable that a sealing member be provided, provided that the dimensions in the axial direction of the rolling bearing permit this. As such a sealing member, in addition to a light-contact type of transmission seal, a non-contact type seal made of metal plate, or a nitryl seal or acryl seal or fluorine seal of a contact type or a non-contact type and the like can be selected to use in consideration of the temperature in use.

Moreover, the construction and the material of the retainer 9 which rotatably holds the rolling elements 8 is not particularly limited. However when the rotational speed in use is particularly high, the use of a crown type retainer made of synthetic resin is desirable to reduce friction between the retainer and the rolling elements, and to suppress the generation of hard wear particles, thus extending life. On the other hand, in cases where rupture of the retainer may occur due to the action of a large variable load, use of a metal waveform retainer is desirable.

Furthermore, in the present example, the outer ring 4, the inner ring 5, and the rolling elements 8 constituting the rolling bearing 3 are made of class 2 bearing steel (SUJ2) wherein the amount of retained austenite $\gamma_R$ is 5 to 15 volume %. However, when there is a large amount of foreign matter inside the belt-type continuously variable transmission, mixed with the CVT fluid, and passing through the installation space of the rolling elements 8 of the rolling bearing 3, it is desirable that the steel constituting the outer ring 4, the inner ring 5, and the rolling elements 8 be at least partially carburized or carbonitrided. If the amount of retained austenite in the surfaces of the outer ring 4, the inner ring 5, and the rolling elements 8 is 20 to 45 volume %, and the surface hardness is approximately ($H_R$ C 62 to 67) with such treatment, damage to these surfaces by foreign matter can be prevented and the durability of the rolling bearing 3 can be increased. Moreover, when the temperature of the rolling bearing 3 in use reaches 150° C. or more, it is desirable that a dimension stabilizing treatment which suppresses retained austenite to approximately 0 to 5% be applied to the outer ring 4, the inner ring 5, and the rolling elements 8. In this case, it is desirable that a heat-resistant rubber be used as the sealing member.

Furthermore, in the present example, the internal clearances of the rolling bearing 3 are normal clearances, and the radius of curvature of the cross-section of the outer ring raceway 6 and the inner ring raceway 7 is 0.52 times the diameter of the rolling elements 8 (0.52 Da) in all cases. However if the internal clearances and radius of curvature of the cross-section of the raceways 6 and 7 are appropriately controlled (kept small; for example, the radius of curvature of the inner ring raceway 7 is controlled to at least 0.505 Da), the radius of curvature of the outer ring raceway 6 is controlled to 0.535 Da, a backlash in the radial direction and backlash in the axial direction are suppressed, and the contact pressure between the rolling contact surfaces of the rolling elements 8 and the outer ring raceway 6 and inner ring raceway 7 is made uniform, then durability-related performance may be further increased. Moreover, regarding the rolling bearing 3, the operation and effects obtained are not limited to the single-row deep-groove type ball bearing as shown in the drawings, and may also be obtained with other types of ball bearings such as angular types, and additionally with cylindrical roller bearings and tapered roller bearings, needle bearings, and other bearings.

EXAMPLES

Next is a description of an experiment conducted to verify the effects of the present invention. In the experiment, as shown in the following Table 1, durability was respectively measured on a total of 14 samples: ten samples (examples 1 through 10) being within the technical scope of the present invention wherein the minimum thickness h of the outer ring 4 was between 0.4 and 0.8 times the diameter Da of the rolling elements (balls) 8, and four samples (comparative examples 1 through 4) being outside the technical scope of the present invention. These samples were based on JIS name-number 6209 (inner diameter d=45 mm, outer diameter D=85 mm, width W=19 mm, ball diameter Da=11.906 mm) and JIS name-number 6310 (inner diameter d=50 mm, outer diameter D=110 mm, width W=27 mm, ball diameter Da=11.906 mm) ball bearings, and were adjusted to the dimensions noted in Table 1 below by respectively varying the outside diameter of each outer ring and the diameter of the balls.

TABLE 1

| | | Outer ring outer diameter D [mm] | Outer ring thickness h [mm] | Ball diameter Da [mm] | h | $L_{10}$ life [hr] | Presence of damage | Other |
|---|---|---|---|---|---|---|---|---|
| Example | 1 | 87 | 5 | 11.906 | 0.42 Da | 500 | 5/5 normal | 6209 base |
| | 2 | 89 | 6 | | 0.50 Da | 500 | 5/5 normal | |
| | 3 | 91 | 7 | | 0.59 Da | 500 | 5/5 normal | |
| | 4 | 93 | 8 | | 0.67 Da | 500 | 1/5 ball damage | |
| | 5 | 95 | 9 | | 0.76 Da | 500 | 2/5 ball damage | |
| | 6 | 117 | 8 | 19.050 | 0.42 Da | 500 | 5/5 normal | 6310 base |
| | 7 | 119 | 9 | | 0.47 Da | 500 | 5/5 normal | |
| | 8 | 121 | 10 | | 0.53 Da | 500 | 5/5 normal | |
| | 9 | 123 | 11 | | 0.58 Da | 500 | 5/5 normal | |
| | 10 | 125 | 12 | | 0.63 Da | 500 | 1/5 ball damage | |
| Comp. example | 1 | 85 | 4 | 11.906 | 0.34 Da | 97 | 5/5 outer ring flaking | 6209 (std) |
| | 2 | 97 | 10 | | 0.84 Da | 125 | 5/5 ball flaking | 6209 base |
| | 3 | 110 | 4.5 | 19.050 | 0.23 Da | 84 | 5/5 outer ring flaking | 6310 (std) |
| | 4 | 113 | 6 | | 0.31 Da | 91 | 5/5 outer ring flaking | 6310 base |

Figure 1:
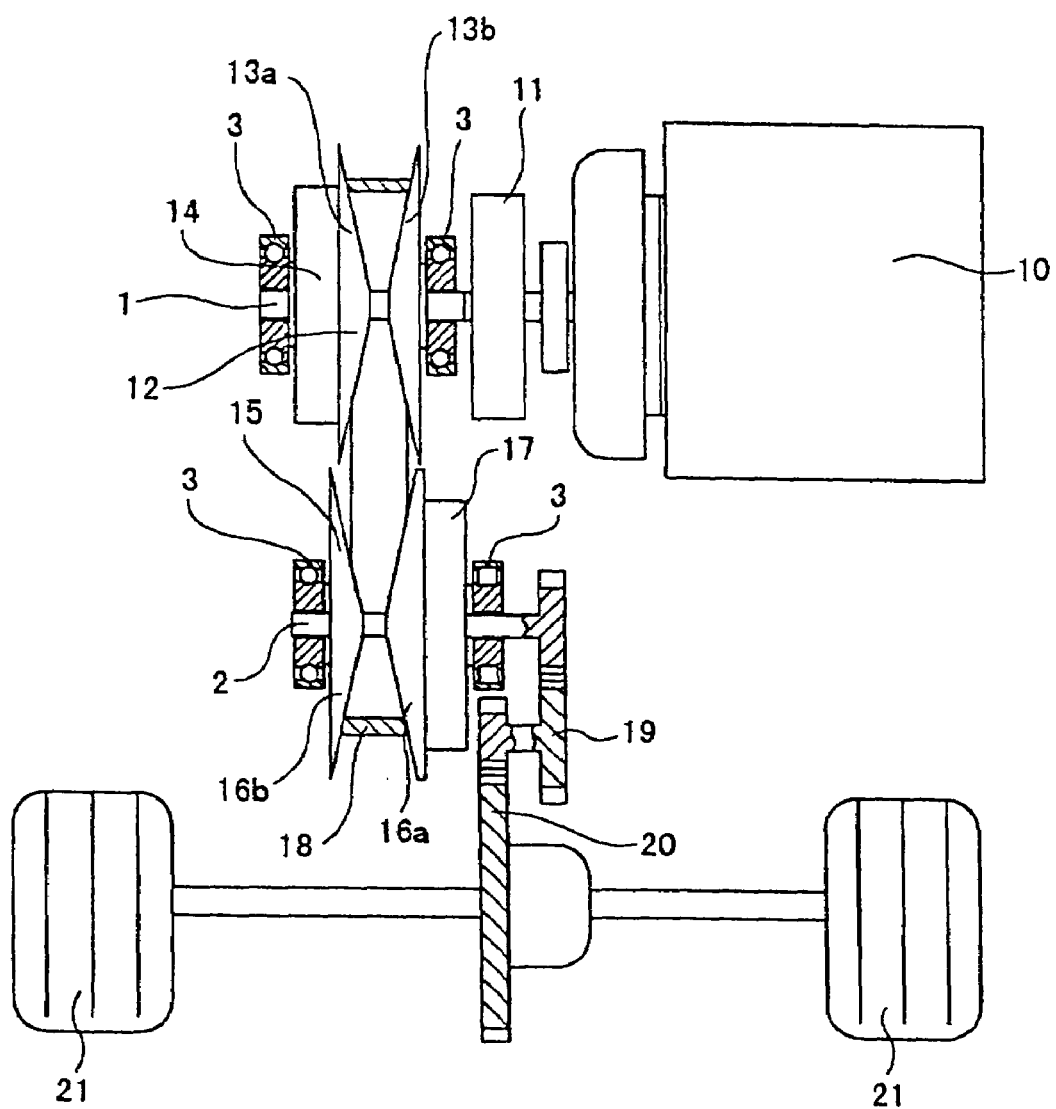
FIG. 1 is a simplified section view of a drive system of an automobile incorporating a belt-type continuously variable transmission comprising rolling bearings being the object of the present invention.
Figure 2:
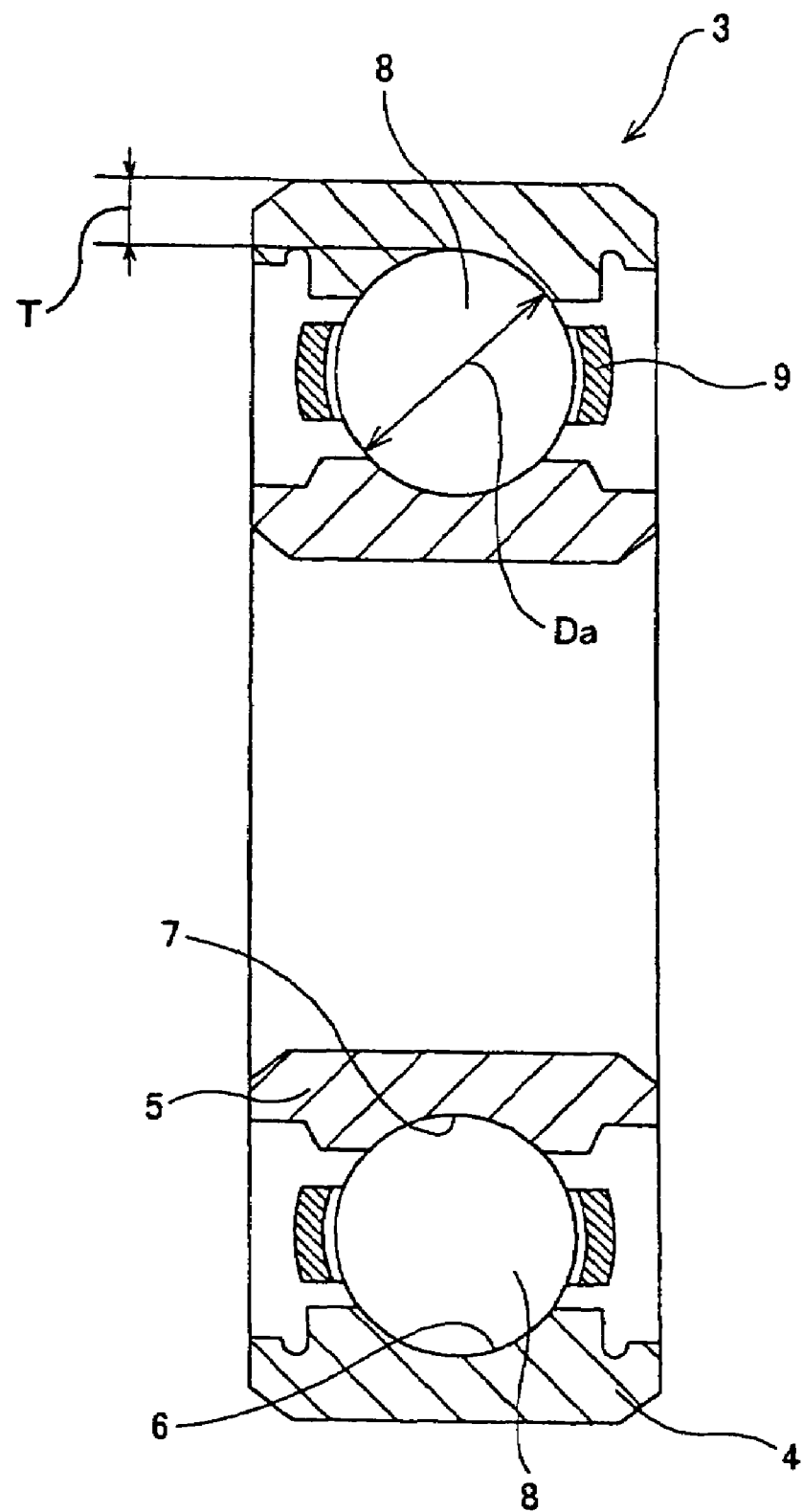
FIG. 2 is one example of an enlarged view showing a removed rolling bearing.
Figure 3:
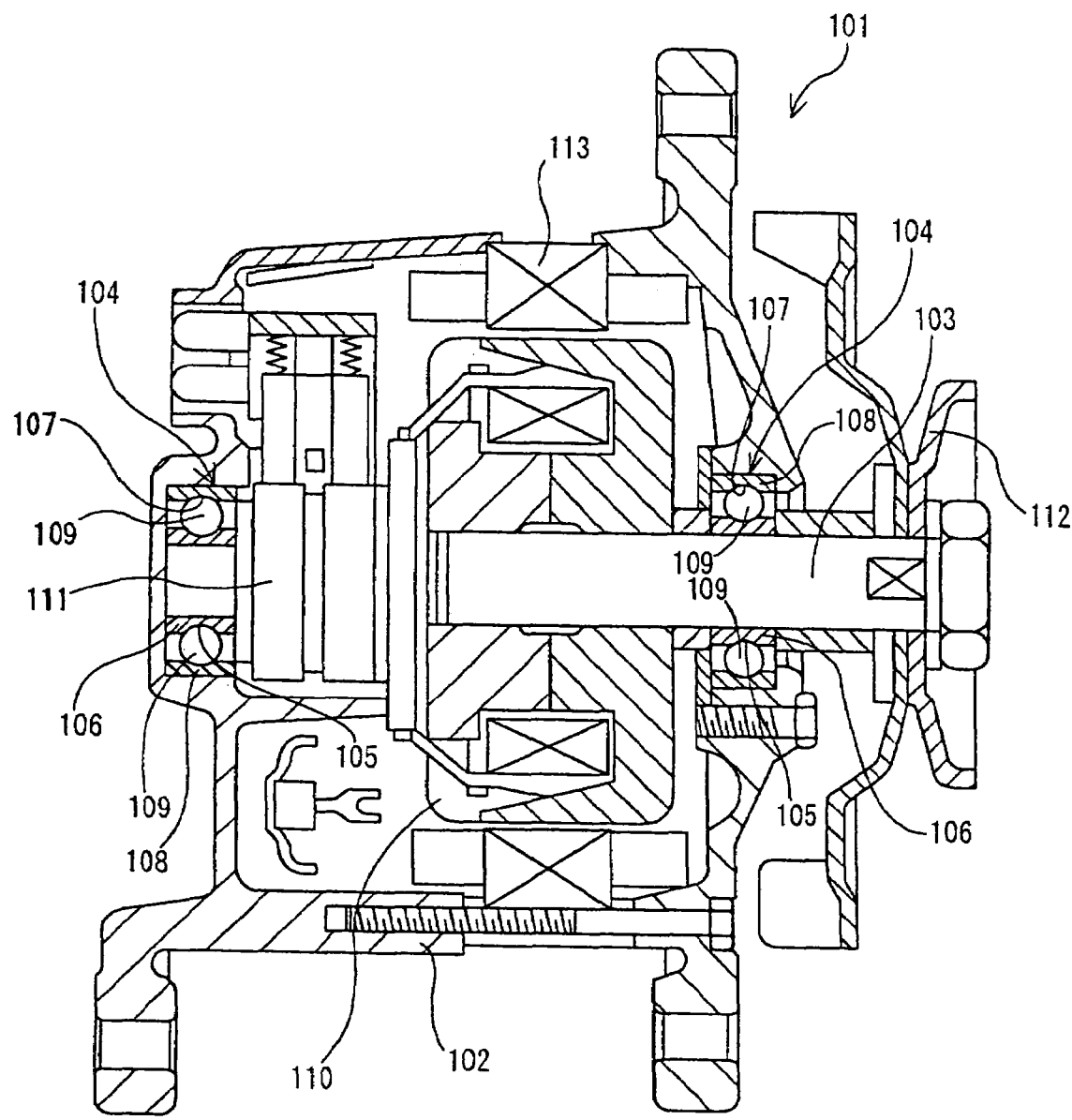
FIG. 3 is a simplified section view showing an example of a heretofore known alternator.

Rolling bearings 3 of the dimensions noted in the Table 1 were respectively incorporated in a belt-type continuously variable transmission as shown in FIG. 1, and employed to rotatably support the input rotating shaft 1 in relation to the transmission case. The arithmetic average roughness Ra of each surface constituting the rolling contact part was between 0.01 and 0.03 μm as with normal rolling bearings. Furthermore, the bearing material was standard class 2 bearing steel (SUJ2, hardness=$H_R$ C 60 to 65). Moreover, steel waveform pressing retainers were employed as the retainer 9. Furthermore, the rolling elements (balls) 8 were of SUJ2, through hardening and annealed, and then finished by grinding and super-finishing.

A durability test was conducted with a target time of 500 hours under the conditions described below. Following completion of the test, the rolling bearings 3 were dismantled and the component parts of the rolling bearings 3 were checked for damage, and the $L_{10}$ life (rated fatigue life) was calculated. In the current experiment, in order to obtain the durability of the rolling bearings 3 incorporated in the rotating support part of the input rotating shaft 1, a sufficient amount (200 cc per minute) of lubricating oil (CVT fluid) was supplied to the rolling bearings 3 incorporated in the rotating support part of the output rotating shaft 2. Moreover care was taken to ensure that rolling bearings 3 not tested would not be damaged before tested rolling bearings 3 would be damaged.

Test conditions were as follows.

| | |
|---|---|
| Test equipment: | Belt-type continuously variable transmission shown in FIG. 1. |
| Number of test samples: | Five of each sample. |
| Method of evaluation: | Dismantled after 500 hours running, however test discontinued immediately and bearing dismantled if vibration value increased rapidly during the test. |
| Input torque from engine to input rotating shaft 1: | 250 N · m (bearings in accordance with or based on JIS name-number 6209), and 500 N · m (bearings in accordance with or based on JIS name-number 6310) |
| Rotational speed of input rotating shaft 1: | 6000 min$^{-1}$ |
| Lubricating oil: | CVT fluid {dynamic viscosity at 40° C. = 35 mm$^2$ per sec = 35 × 10$^{-6}$ m$^2$ per sec (35 cSt), viscosity at 100° C. = 7 mm$^2$ per sec = 7 × 10$^{-6}$ m$^2$ per sec (7 cSt)} |
| Lubricating oil flow rate: | 10 cc per minute |
| Bearing temperature: | 120° C. |

The ratio of engine torque and basic dynamic load rating of rolling bearing was approximately the same for all rolling bearings.

The following points were understood from the results of the experiment conducted under the above conditions.

Firstly, in all examples 1 through 10 within the technical scope of the present invention, operation was able to be continued without damage to the rolling bearings 3 until they reached the target 500 hours. Moreover, of these, examination of the raceway surfaces of examples 1 through 3 and examples 6 through 9 after the test revealed that polishing traces remained and the state of lubrication was satisfactory. Furthermore, no damage based on creep was apparent on the outer peripheral surface of the outer ring 4.

On the other hand, damage to the rolling elements (balls) 8 was found in examples 4, 5, and 10. This damage was considered to be due to the fact that the outer ring 4 did not readily elastically deform when the rolling elements (balls) 8 were assembled into the rolling bearings 3, due to the thickness h of the outer ring 4 being large enough. Consequently it was understood that the rolling elements 8 should not be readily damaged when assembling such rolling bearings 3, and it is more desirable that the thickness h of the outer ring be 0.4 Da to 0.6 Da (0.4 Da≦h≦0.6 Da).

Moreover, premature flaking occurred (after 84 to 125 hours) in the rolling contact parts, and severe vibration was generated in all the comparative examples 1 through 4 outside the technical scope of the present invention. Furthermore, of these, examination of the raceway surfaces of comparative examples 1 and 3 revealed that part of the polishing traces had not remained, and it was considered that localized metal-to-metal contact had occurred. Moreover, damage to the outer peripheral surface of the outer ring 4 based on creep was apparent, and it was considered that slippage of the rolling elements 8 occurred in the load zone of the outer ring based on this creep. Furthermore, since the thickness h of the outer ring 4 of the comparative example 2 was too great at 0.84 Da, it was considered that premature flaking occurred at the point of damage occurring when the rolling elements (balls) 8 were assembled into the rolling bearing 3. Moreover, since the thickness h of the outer ring 4 of the comparative example 4 was too small at 0.31 Da, similarly to the comparative examples 1 and 3, damage based on metal-to-metal contact in the rolling contact parts accompanying elastic deformation of the outer ring 4 was apparent on the outer ring raceway 6.

Figure 5:
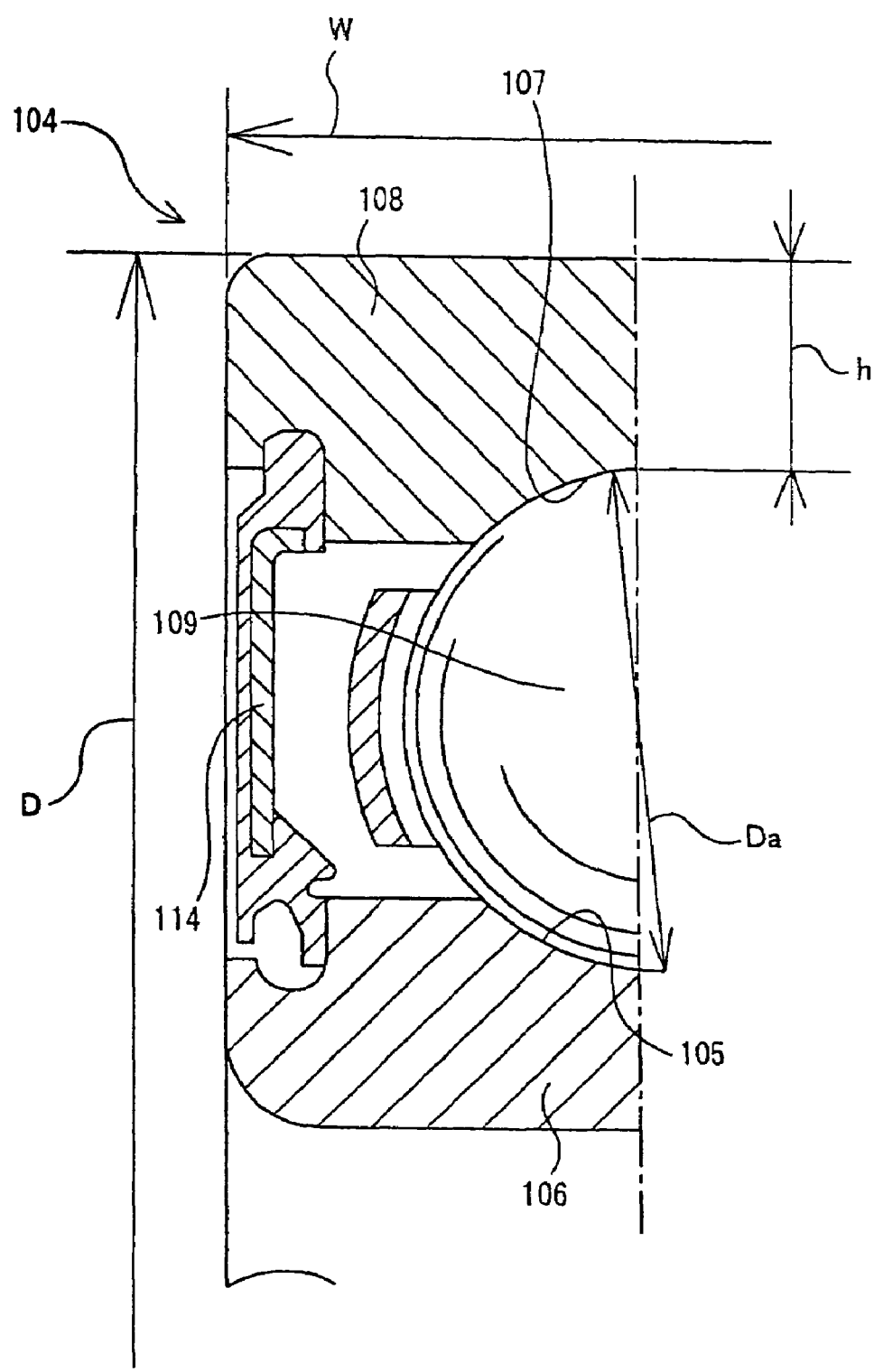
FIG. 5 is a partial section view showing an example of the embodiment of the present invention.

FIG. 5 shows another example of an embodiment of the present invention. The rolling bearing 104 of the present example being a deep-groove type ball bearing comprises an inner ring 106 being a rotating ring formed with an inner ring raceway 105 on the outer peripheral face, an outer ring 108 being a fixed ring formed with an outer ring raceway 107 on the inner peripheral face, and a plurality of balls 109 being rolling elements rotatably arranged between the inner ring raceway 105 and the outer ring raceway 107. Furthermore, sealing rings 114 are provided in the openings at both ends of the part where the plurality of balls 109 are provided between the inner peripheral surface of the outer ring 108 and the outer peripheral surface of the inner ring 106.

In particular, with the rolling bearing 104 of the present example, if the outer diameter of the outer ring 108 is D, the width in the axial direction of this outer ring 108 is W, the minimum thickness of the part where the outer ring raceway 107 is provided on the middle portion in the axial direction of the outer ring 108 is h, and the diameter of the balls 9 is Da, the respective dimensions are controlled so that the value K calculated by $\{(h^{1.5} \cdot W)/(Da^{1.1} \cdot D^{0.5})\}$ satisfies the relationship $1.20 \leq K \leq 2.00$.

According to the rolling bearing 104 of the present example constructed as described above, even if the outer ring 108 is fixed to a low-rigidity housing made of light metal such as aluminum alloy, sufficient rigidity of the outer ring 108 can be maintained, and premature flaking based on elastic deformation of the outer ring 108 can be prevented, without needlessly increasing the size of the outer ring 108, and consequently the rolling bearing 104.

Figure 6:
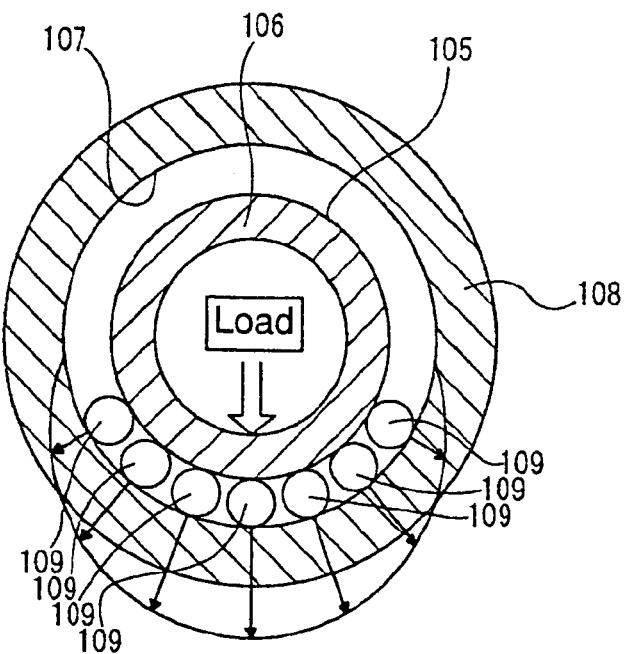
FIG. 6 is a diagram schematically showing load applied to an outer ring via rolling elements, in the case of a high-rigidity housing.
Figure 7:
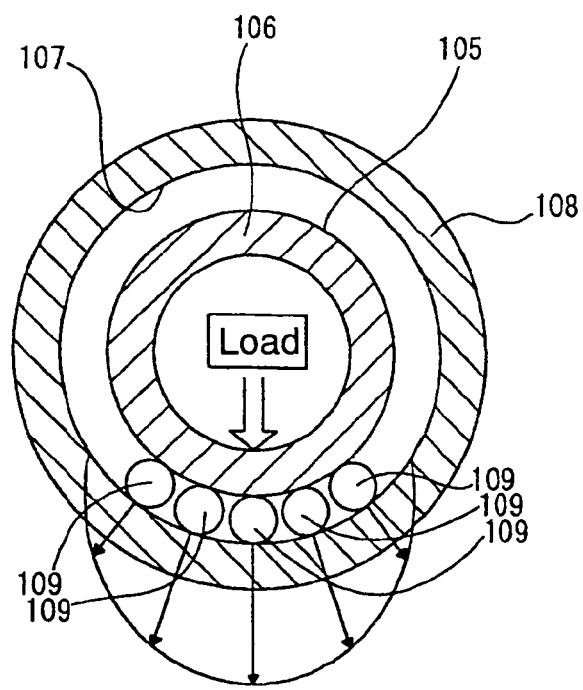
FIG. 7 is a diagram schematically showing load applied to the outer ring via rolling elements, in the case of a low-rigidity housing.

That is to say, research by the inventor of the present invention has shown that, if the rigidity of the housing is low, the outer ring 108 elastically deforms together with the housing to an extent which cannot be ignored, and premature flaking occurs due to such elastic deformation. Specifically, when the rigidity of the housing securing the outer ring 108 is high, if a load is applied to the rolling bearing, a load distribution from each ball 109 becomes as shown by the arrows in FIG. 6. On the other hand, when the rigidity of this housing is low, the load distribution from each ball 109 becomes as shown by the arrows in FIG. 7. As is apparent from FIG. 6 and FIG. 7, when the rigidity of the housing is high, an average load is applied to the outer ring 108 from a large number of balls 109 (a large load zone), however, when the rigidity of the housing is low, the load is applied to the outer ring 108 concentrated from a small number of balls 109 (small load zone). That is to say, the outer ring 108 is elastically deformed such that it is expanded outwards in the radial direction around the part where the load is applied (lowermost point of radial load zone), and since the expanded part can no longer support the load, there is a tendency for the load to be concentrated at the part wherein the load is applied. If the balls 109 enter the part wherein the load is concentrated in this manner from the non-load zone, a constraining force is applied abruptly to these balls 109 (the extent of constraint increases considerably), and severe slippage occurs readily between the rolling contact surfaces of the balls 109 and the outer ring raceway 107 and the inner ring raceway 105.

The oil film formed in the rolling contact parts between the rolling contact surfaces of the balls 109 and the inner ring raceway 105 and the outer ring raceway 107 then readily breaks down in association with this slippage, and metal-to-metal contact occurs readily between the rolling contact surfaces of the balls 109 and the inner ring raceway 105 and outer ring raceway 107. Moreover, also if the balls 109 spring out from the load zone, since they are suddenly released from a large constraining force, slippage occurs in the same manner, and metal-to-metal contact occurs readily accompanying this slippage. Premature flaking then occurs readily in the rolling contact parts between the rolling contact surfaces of the balls 109 and the inner ring raceway 105 and the outer ring raceway 107 based on this metal-to-metal contact. If the rigidity of the housing is low, the outer ring raceway 107 readily deforms elastically (such that the peripheral groove forms a wave-shape in the radial direction) based on the load from the balls 109 in (passing through) the load zone. The slippage also occurs readily due to elastic deformation of the raceway surface in this manner, and may accelerate premature flaking. Furthermore, the metal-to-metal contact occurs more readily with high levels of vibration, high temperatures, and increased water in the lubricating oil and water mixed due to condensation and the like.

Therefore the thickness h and the width W of the outer ring 108 are optimized so that as mentioned above, the value K calculated by $\{(h^{1.5} \cdot W)/(Da^{1.1} \cdot D^{0.5})\}$ is controlled to within a range of $1.20 \leq K \leq 2.00$, and elastic deformation of the outer ring 108 does not occur readily, and premature flaking due to the mechanism described above is thus prevented. That is to say, application and release of constraint of the balls 109 is comparatively gradually performed at both ends in the load zone, and the premature flaking is prevented. If K is less than 1.20, the rigidity of the outer ring 108 is too low, and if the outer ring 108 is fixed to a low-rigidity housing made of aluminum alloy or the like, elastic deformation of the outer ring 108 occurs readily and flaking as described above may occur at an early stage. On the other hand, if K exceeds 2.00, the rigidity of the outer ring 108 may be too high, so that when the balls 109 are assembled into the rolling bearing 104, deformation of the outer ring 108 exceeds the range of elastic deformation, so that plastic deformation occurs and the outer ring 108 is damaged.

Moreover, the inventor of the present invention also focused on the creep of the outer ring 108 rotating in the same direction as the direction of rotation of the inner ring 106 based on the rotating resistance of the rolling bearing 104. It was then understood that by optimizing the thickness h and width W of the outer ring 108 as described above so that elastic deformation of the outer ring 108 does not occur readily, premature flaking as described above and creep of the outer ring can be prevented. That is to say, it was understood that by ensuring rigidity of the outer ring 108, a localized increase in the surface pressure between the outer ring 108 and the housing can be suppressed, and creep of the outer ring due to this localized increase in the surface pressure can be prevented.

Next is a description of an experiment conducted to verify the effects of the present invention. In the experiment, durability of the samples respectively shown in the following Table 2 and Table 3 was measured. In Table 2 and Table 3, samples within the technical scope of the present invention were examples 11 through 16, and samples outside the technical scope of the present invention were comparative examples 5 through 8. Furthermore, respective samples shown in Table 2 below were based on JIS name-number 6204 (inner diameter d=20 mm, outer diameter D=47 mm, width W=14 mm, ball diameter Da=7.937 mm, minimum thickness h of outer ring=2.781 mm) deep-groove type ball bearings of standard class 2 bearing steel (SUJ2), and samples shown in Table 3 were based on JIS name-number 6207 (inner diameter d=35 mm, outer diameter D=72 mm, width W=17 mm, ball diameter Da=11.112 mm, minimum thickness h of outer ring=3.694 mm) deep-groove type ball bearings of standard class 2 bearing steel (SUJ2), and the value K calculated by $\{(h^{1.5} \cdot W)/(Da^{1.1} \cdot D^{0.5})\}$ was adjusted by respectively varying the outer diameter D of each outer ring.

TABLE 2

| | Outer diameter of outer ring D [mm] | K = $\{(h^{1.5} \cdot W)/(Da^{1.1} \cdot D^{0.5})\}$ | Sample No. | Test time [hr] |
|---|---|---|---|---|
| Comparative example 5 | Φ47 | 0.97 | 1 | 265 |
| | | | 2 | 303 |
| | | | 3 | 211 |
| | | | 4 | 335 |
| | | | 5 | 198 |
| Comparative example 6 | Φ47.5 | 1.10 | 1 | 358 |
| | | | 2 | 387 |
| | | | 3 | 432 |
| | | | 4 | 500← |
| | | | 5 | 455 |
| Example 11 | Φ48 | 1.22 | 1 | 500← |
| | | | 2 | 465 |
| | | | 3 | 500← |
| | | | 4 | 500← |
| | | | 5 | 500← |
| Example 12 | Φ48.5 | 1.36 | 1 | 500← |
| | | | 2 | 500← |
| | | | 3 | 500← |
| | | | 4 | 500← |
| | | | 5 | 500← |
| Example 13 | Φ49 | 1.51 | 1 | 500← |
| | | | 2 | 500← |
| | | | 3 | 500← |
| | | | 4 | 500← |
| | | | 5 | 500← |

TABLE 3

| | Outer diameter of outer ring D [mm] | K = $\{(h^{1.5} \cdot W)/(Da^{1.1} \cdot D^{0.5})\}$ | Sample No. | Test time [hr] |
|---|---|---|---|---|
| Comparative example 7 | Φ72 | 1.01 | 1 | 388 |
| | | | 2 | 452 |
| | | | 3 | 546 |
| | | | 4 | 420 |
| | | | 5 | 553 |
| Comparative example 8 | Φ72.5 | 1.11 | 1 | 486 |
| | | | 2 | 580 |
| | | | 3 | 530 |
| | | | 4 | 670 |
| | | | 5 | 710← |

TABLE 3-continued

| | Outer diameter of outer ring D [mm] | K = $\{(h^{1.5} \cdot W)/(Da^{1.1} \cdot D^{0.5})\}$ | Sample No. | Test time [hr] |
|---|---|---|---|---|
| Example 14 | Φ73 | 1.21 | 1 | 710← |
| | | | 2 | 710← |
| | | | 3 | 710← |
| | | | 4 | 682 |
| | | | 5 | 710← |
| Example 15 | Φ73.5 | 1.31 | 1 | 710← |
| | | | 2 | 710← |
| | | | 3 | 710← |
| | | | 4 | 710← |
| | | | 5 | 710← |
| Example 16 | Φ74 | 1.42 | 1 | 710← |
| | | | 2 | 710← |
| | | | 3 | 710← |
| | | | 4 | 710← |
| | | | 5 | 710← |

Durability tests of the rolling bearings of the respective dimensions noted in Table 2 and Table 3 were then conducted with a target time of 500 hours (Table 2) and 710 hours (Table 3) under the conditions described below, and time until flaking occured was investigated. The reason for setting the target times as above was so that the $L_{10}$ life (rated fatigue life) under the conditions of the experiment was 494 hours (Table 2) and 705 hours (Table 3). Moreover, in the current experiment, inner ring rotation was with the outer ring fixed to the housing and the inner ring rotated. Furthermore, with the samples in Table 2, sealing rings were provided in the openings at both ends of the part where the plurality of balls were provided between the inner peripheral surface of the outer ring and the outer peripheral surface of the inner ring, and lubrication was with grease. Moreover, with the samples in Table 3, no sealing rings were provided, and the openings at both ends of the part where the plurality of balls were provided were left open, and forced lubrication was employed by making lubricating oil circulate through this part.

Test conditions were as follows.

(1) Table 2 samples:

| | |
|---|---|
| Number of test samples: | Five of each sample. |
| Internal clearance: | C3 |
| Radius of curvature of inner ring raceway and outer ring raceway: | 52% of ball diameter |
| Load: | P (bearing load)/C (dynamic load rating) = 0.15 |
| Rotational speed of inner ring: | 10000 min$^{-1}$ |
| Lubricant: | EA2 grease, enclosed capacity 35% |
| Ambient temperature: | 100° C. |
| Water content of grease: | 1 weight % of grease |

(2) Table 3 samples

| | |
|---|---|
| Number of test samples: | Five of each sample. |
| Internal clearance: | C3 |
| Radius of curvature of inner ring raceway and outer ring raceway: | 52% of ball diameter |
| Load: | P (bearing load)/C (dynamic load rating) = 0.15 |
| Rotational speed of inner ring: | 7000 min$^{-1}$ |
| Lubricant: | ATF fluid {dynamic viscosity at 40° C. = 35 mm$^2$ per sec = 35 × 10$^{-6}$ m$^2$ per sec (35 cSt), dynamic viscosity at 100° C. = 7 mm$^2$ per sec = 7 × 10$^{-6}$ m$^2$ per sec (7 cSt)} |

-continued

| | |
|---|---|
| Oil temperature: | 100° C. |
| Water content of grease: | 1 weight % (30 cc) in 3 l of lubricating oil |

The following points were understood from the results of the experiment conducted under the above conditions.

Firstly, in Table 2, in comparative example 5 (D=47 mm, k=0.97) having the standard outer diameter of outer ring and being outside the technical scope of the present invention, no sample reached the calculated life ($L_{10}$ life) of 494 hours, and premature flaking occurred. On the other hand, the majority (14 of 15) of samples in examples 11 through 13 within the technical scope of the present invention satisfied the calculated life. Even if the outer diameter D of the outer ring exceeded 49 mm, it was found that premature flaking could be prevented. However, if the outer diameter D of the outer ring exceeded 51 mm (K=2.10), that is to say, when K exceeds 2.00, the outer ring plastically deforms when assembling the balls into the rolling bearing, and hence this is not desirable.

Furthermore, in Table 3, in the comparative example 7 (D=72 mm, k=1.01) having the standard outer diameter of outer ring and being outside the technical scope of the present invention, no sample reached the calculated life ($L_{10}$ life) of 705 hours, and premature flaking occurred. On the other hand, the majority (14 of 15) of samples in examples 14 through 16 within the technical scope of the present invention satisfied the calculated life. Even if the outer diameter D of the outer ring exceeded 74 mm, it was found that premature flaking could be prevented. However, if the outer diameter D of the outer ring exceeded 77 mm (K=2.11), that is to say, when K exceeds 2.00, the outer ring plastically deforms when assembling the balls into the rolling bearing, and hence this is not desirable.

Figure 8:
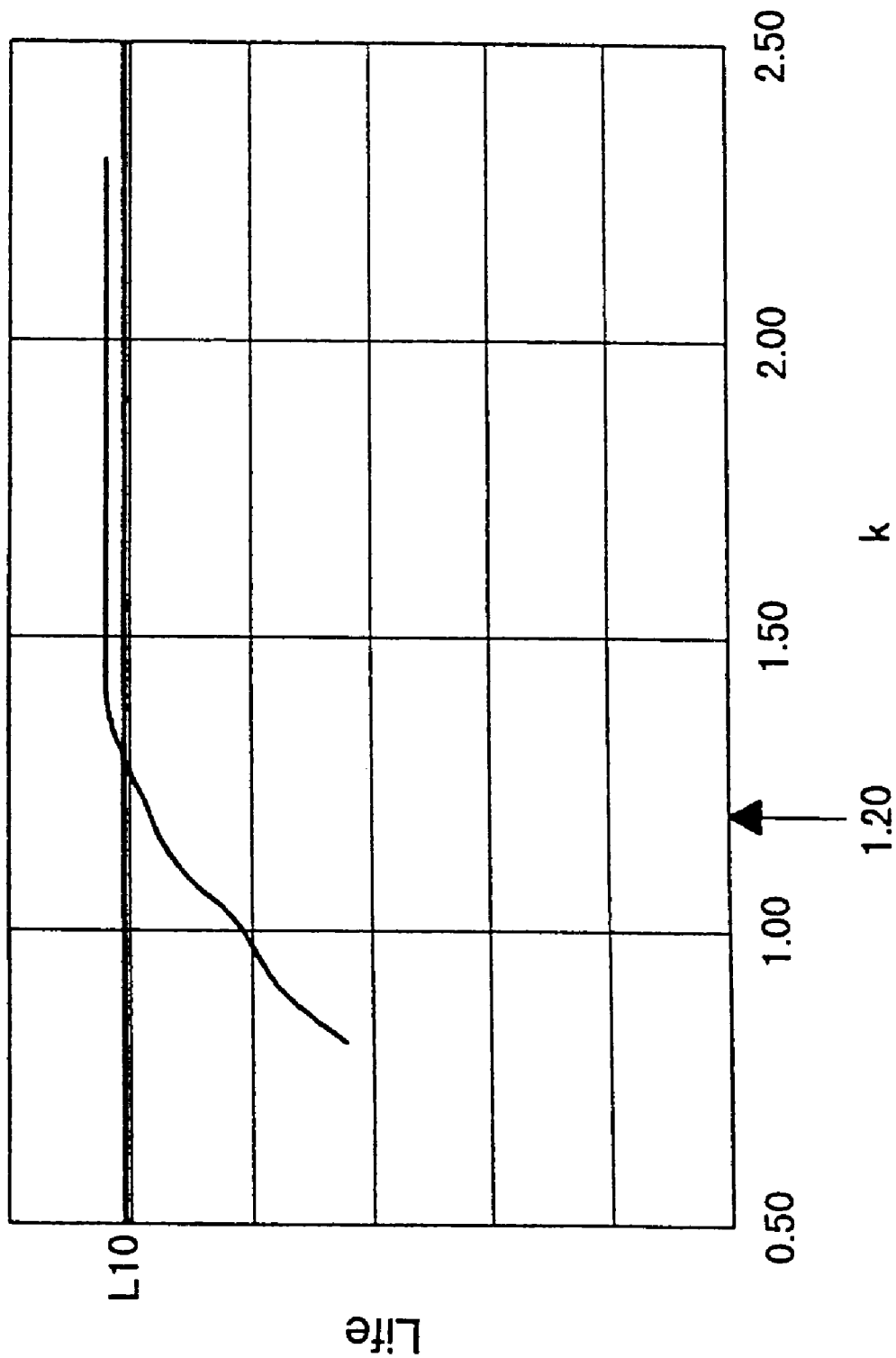
FIG. 8 is a graph showing the results of an experiment conducted to verify effects.

The relationship between the life of the rolling bearing and the K value is shown in FIG. 8. As is apparent from FIG. 8, even when the outer ring is fixed to a low-rigidity housing made of aluminum alloy or the like, the outer ring is not readily elastically deformed and sufficient life can be maintained, by controlling K to 1.20 to 2.00.

INDUSTRIAL APPLICABILITY

Since the rolling bearing of the present invention for use in belt-type continuously variable transmissions is constructed and operates as described above, sufficient durability can be maintained even if a low-viscosity CVT fluid is employed, and the outer ring is fixed in a transmission case having a low-rigidity. It is therefore possible to increase the efficiency of belt-type continuously variable transmissions while maintaining durability.

Moreover, since the present invention is constructed and operates as described above, even when the outer ring is fixed in a low-rigidity housing made of aluminum alloy or the like, premature flaking can be prevented, contributing to increased durability of various rotating machinery and equipment incorporating the rolling bearing, without needlessly increasing the size of the outer ring. The invention is particularly suitable for the case of supporting a rotating shaft provided with a pulley or gear such as with an alternator or a transmission, in a housing made of a low-rigidity material such as aluminum alloy as described above, and can contribute to increased durability and reliability of such an alternator or transmission.

The invention claimed is:

1. A rolling bearing for vehicle comprising:
   an outer ring having an outer ring raceway on an inner peripheral surface;
   and an inner ring having an inner ring raceway on an outer peripheral surface; and
   a plurality of rolling elements rotatably provided between the outer ring raceway and the inner ring raceway,
   and when a minimum thickness of a part where the outer ring raceway is provided on a middle portion in the axial direction of the outer ring is h, and a diameter of each rolling element is Da, the relationship 0.4 Da≦h≦0.8 Da is satisfied.

* * * * *